(12) United States Patent
Fang et al.

(10) Patent No.: US 11,961,433 B2
(45) Date of Patent: Apr. 16, 2024

(54) DETECTION STRUCTURE, DISPLAY PANEL, DETECTION DEVICE FOR DETECTING DISPLAY PANEL AND DETECTION SYSTEM

(71) Applicants: Fuzhou BOE Optoelectronics Technology Co., Ltd., Fujian (CN); BOE Technology Group Co., Ltd., Beijing (CN)

(72) Inventors: Xin Fang, Beijing (CN); Duosi Tang, Beijing (CN); Yang Yu, Beijing (CN); Wenchao Wang, Beijing (CN)

(73) Assignees: FUZHOU BOE OPTOELECTRONICS TECHNOLOGY CO., LTD., Fuzhou (CN); BOE TECHNOLOGY GROUP CO., LTD., Beijing (CN)

( * ) Notice: Subject to any disclaimer, the term of this patent is extended or adjusted under 35 U.S.C. 154(b) by 303 days.

(21) Appl. No.: 17/406,264

(22) Filed: Aug. 19, 2021

(65) Prior Publication Data

US 2022/0044605 A1    Feb. 10, 2022

Related U.S. Application Data

(63) Continuation-in-part of application No. PCT/CN2021/072160, filed on Jan. 15, 2021.

(30) Foreign Application Priority Data

Feb. 28, 2020   (CN) .......................... 202010130719.2

(51) Int. Cl.
*G09G 3/00*    (2006.01)
*G02F 1/1362*  (2006.01)
*G09G 3/36*    (2006.01)

(52) U.S. Cl.
CPC ....... *G09G 3/006* (2013.01); *G02F 1/136254* (2021.01); *G02F 1/136286* (2013.01); *G09G 3/3688* (2013.01); *G09G 2330/12* (2013.01)

(58) Field of Classification Search
CPC .. G09G 3/006; G09G 3/3688; G09G 2330/12; G02F 1/136254; G02F 1/136286
See application file for complete search history.

(56) References Cited

U.S. PATENT DOCUMENTS

2007/0216846 A1* 9/2007 Tseng ................. G02F 1/13452
349/149
2009/0146678 A1* 6/2009 Chen ...................... G09G 3/006
324/760.02

(Continued)

FOREIGN PATENT DOCUMENTS

CN    106875879 A    6/2017
CN    206541109 U   10/2017

(Continued)

*Primary Examiner* — Kwang-Su Yang
(74) *Attorney, Agent, or Firm* — WHDA, LLP (57) ABSTRACT

A detection structure, a display panel, a detection device and a detection system, the detection structure is located in display panel, and the detection structure includes test units and groups of first connecting lines; each of the test units includes chip bonding part, test pin parts located at chip bonding part, and groups of second connecting lines; in each test units, first end of each group in groups of second connecting lines is connected with test pin parts, and second end of each group of second connecting lines is connected with chip bonding part; in two adjacent test units in test units, two adjacent test pin parts are respectively connected with first end and second end of one group of first connecting lines; and when detection structure is used in lightening test, at least two test units arranged at intervals are configured for being electrically connected with detection device respectively.

18 Claims, 4 Drawing Sheets

(56) References Cited

U.S. PATENT DOCUMENTS

| | | |
|---|---|---|
| 2011/0037746 A1 | 2/2011 | Kim et al. |
| 2016/0379906 A1* | 12/2016 | Kim .................... G09G 3/3688 |
| | | 257/48 |
| 2018/0047804 A1 | 2/2018 | Zhou et al. |
| 2019/0013473 A1* | 1/2019 | Tu .......................... G01N 21/27 |
| 2020/0152826 A1* | 5/2020 | Lee ......................... H01L 33/24 |
| 2020/0211428 A1 | 7/2020 | Wei et al. |

FOREIGN PATENT DOCUMENTS

| | | |
|---|---|---|
| CN | 108388054 A | 8/2018 |
| CN | 109448617 A | 3/2019 |
| CN | 109523943 A | 3/2019 |
| CN | 109682998 A | 4/2019 |
| CN | 110599936 A | 12/2019 |
| CN | 110827729 A | 2/2020 |
| CN | 111158177 A | 5/2020 |

\* cited by examiner

DETECTION STRUCTURE, DISPLAY PANEL, DETECTION DEVICE FOR DETECTING DISPLAY PANEL AND DETECTION SYSTEM

CROSS REFERENCE TO RELEVANT DISCLOSURES

The present patent application is a Continuation-in-Part of PCT Application No. PCT/CN2021/072160, filed Jan. 15, 2021, claiming priority of CN application number 202010130719.2. filed Feb. 28, 2020, and the title of "DETECTION STRUCTURE, DISPLAY PANEL, DETECTION DEVICE AND DETECTION SYSTEM", which is incorporated herein in its entirety by reference.

TECHNICAL FIELD

The present disclosure relates to the technical field of display, and particularly relates to a detection structure, a display panel, a detection device and a detection system.

BACKGROUND

A liquid crystal display panel plays a pivotal role in the technical field of display. The liquid crystal display panel generally comprises a color-film substrate and an array substrate aligned in cells and a liquid crystal disposed between the color-film substrate and five array substrate. A cut liquid crystal cell is subjected to a lightening test (Cell Test, CT) to confirm whether there is a defect in the liquid crystal cell before the liquid crystal display panel is delivered from the factory. In this test process, a testing signal is input to the liquid crystal panel to make the liquid crystal panel present colorful pixels, and then a lightening frame is tested through a defect observation device to confirm whether each pixel is in good condition.

In the existing 2D lightening test design, a plurality of Chip On Film (COF) bonding areas are arranged in a non-display area of a display panel, and a group of lightening test pins (CT Pad) are respectively arranged on left and light sides of each COF bonding area. During the lightening test, positions of a plurality of probe blocks on a Probe Unit (PU) are in one-to-one correspondence with positions of the plurality of COF bonding areas, and one side of each probe block close to the display panel is respectively provided with two groups of probes (Blades) which are respectively contacted with the lightening test pins on two sides of the corresponding COF bonding area. In this way, different signals may be input to the lightening test pins through the probes of the probe block, so that the lightening test is realized.

SUMMARY

The embodiments of the present disclosure provide a detection structure, a display panel, a detection device and a detection system.

To achieve the above objects, the embodiments of the present disclosure adopt the following technical solutions.

According to a first aspect, a detection structure is provided, which is located in a non-display area of a display panel, wherein the detection structure comprises:

a plurality of test units and a plurality of groups of first connecting lines;

each of the plurality of test units comprises a chip bonding part, test pin parts located at two sides of the chip bonding part, and a plurality of groups of second connecting lines;

in each of the plurality of test units, a first end of each group of second connecting lines in the plurality of groups of second connecting lines is connected with the test pin parts, and a second end of each group of second connecting hues in the plurality of groups of second connecting lines is connected with the chip bonding part;

in any two adjacent test units in the plurality of test units, two adjacent test pin parts are respectively connected with the first end and the second end of one group in the plurality of groups of first connecting lines; and Optionally, each of the test pin parts comprises at least a data odd pin, a data even pin, and a common signal line pin; and each group of the plurality of groups of first connecting lines comprises three first connecting lines, and the three first connecting lines are respectively and correspondingly connected with the data odd pins, the data even pins and the common signal line pins of two adjacent test pin parts.

Optionally, each of the test pin parts comprises at least a first subpixel data line pin, a second subpixel data line pin, a third subpixel data line pin and a common signal line pin; and each group of the plurality of groups of first connecting lines comprises four first connecting lines, and the four first connecting lines are respectively and correspondingly connected with the first subpixel data line pins, the second subpixel data line pins, the third subpixel data line pins and the common signal line pins of two adjacent test pin parts.

Optionally, the first color subpixel data line pin is a red subpixel data line pin, the second color subpixel data line pin is a green subpixel data line pin and the third subpixel data line pin is a green subpixel data line pin.

Optionally, the red subpixel data line pin, the green subpixel data line pin, the blue subpixel data line pin and the common signal line pin are respectively configured for transmitting a red subpixel data line signal, a green subpixel data line signal, a blue subpixel data line signal and a common signal line signal.

Optionally, a first color subpixel data line pin, a second color subpixel data line pin, a third color subpixel data line pin, a fourth color subpixel data line pin and a common signal line pin are respectively configured for transmitting signals.

Optionally, the first color subpixel data line pin is a red subpixel data line pin, the second color subpixel data line pin is a green subpixel data line pin, the third subpixel data line pin is a blue subpixel data line pin and the fourth subpixel data line pin is a white subpixel data line pin; and the red subpixel data line pin, the green subpixel data line pin, the blue subpixel data line pin, the white subpixel data line and the common signal line pin are respectively configured for transmitting a red subpixel data line signal, a green subpixel data line signal, a blue subpixel data line signal, a white subpixel data line signal and a common signal line signal.

Optionally, a first color subpixel data line pin, a second color subpixel data line pin, a third color subpixel data line pin, a fourth color subpixel data line pin and a common signal line pin are respectively configured for transmitting signals.

Optionally, the first color subpixel data line pin is a red subpixel data line pin, the second color subpixel data line pin is a green subpixel data line pin, the third subpixel data line pin is a green subpixel data line pin and the fourth subpixel data line pin is a yellow subpixel data line pin; and the red subpixel data line pin, the green subpixel data line pin, the blue subpixel data line pin, the yellow subpixel data line and the common signal line pin are respectively configured for transmitting a red subpixel data line signal, a green subpixel data line signal, a blue subpixel data line signal, a yellow subpixel data line signal and a common signal line signal.

Optionally, the plurality of first connecting lines connected to the data odd pins and data even pins are disposed at the same layer with a source drain electrode layer, and the plurality of second connecting lines connected to the pad of common pins are disposed at the same layer with a gate.

Optionally, when the detection structure is used in a lightening test, two test units arranged at intervals are electrically connected with the detection device respectively, and the two test units arranged at intervals are located at two ends of the detection structure respectively.

According to a second aspect, a display panel is provided, comprising the detection structure mentioned above and a plurality of subpixels located in a display area and arranged in an array.

Optionally, A display panel, comprising a plurality of test units, a plurality of groups of first connecting lines, and a plurality of subpixels located in a display area and arranged in an array;

each of the plurality of test units comprises a chip bonding part and test pin parts located at two sides of the chip bonding part;

in each of the plurality of test unit, a glass base is revealed between the bonding chip and the test pin parts; and in any two adjacent test units in the plurality of test units, two adjacent test pin parts are respectively connected with the first end and the second end of one group in the plurality of groups of first connecting lines.

Optionally, the chip bonding part is configured for bonding a chip, and the chip bonding part is electrically connected with the plurality of subpixels in a lightening test so as to input a signal to the subpixels according to a signal input from the test pin part, thereby realizing display, and further realizing detection according to a condition of a display frame.

Optionally, the plurality of groups of first connecting lines are arranged at one side of two adjacent test pin parts close to the display area.

Optionally, the plurality of groups of second connecting lines are arranged at one side of two adjacent test pin parts far away from the display area.

According to a third aspect, a detection device for detecting the display panel mentioned above is provided, wherein the display panel comprises the detection structure mentioned above, and neither the plurality of groups of second connecting lines nor the plurality of groups of first connecting lines in the detection structure are disconnected; moreover, the detection device comprises at least two probe blocks arranged at intervals; and the probe blocks are contacted with the plurality of test units in the detection structure of the display panel in a lightening test, wherein the probe blocks are in one-to-one correspondence to the plurality of test units.

Optionally, the detection device comprises the two probe blocks arranged at intervals, and the two probe blocks arranged at intervals are respectively located at two ends of the detection device.

Optionally, the detection device further comprises a plurality of probe block clamping slots arranged at intervals.

According to a fourth aspect, a detection system is provided, comprising a controller, a display panel and the detection device above, wherein:

the display panel comprises the detection structure mentioned above, and neither the plurality of groups of second connecting lines nor the plurality of groups of first connecting lines in the detection structure are disconnected;

the detection device is configured for detecting the display panel; and the controller is configured for inputting a data signal to the probe block of the detection device; detecting whether a display frame of the display panel is good; if yes, determining that the display panel is normal; and if not, determining that the display panel is abnormal.

The above description is merely a summary of the technical solutions of the present disclosure. In order to more clearly know the technical means of the present disclosure to enable the implementation according to the contents of the description, and in order to make the above and other purposes, features and advantages of the present disclosure more apparent and understandable, the particular embodiments of the present disclosure are provided below.

BRIEF DESCRIPTION OF THE DRAWINGS

In order to more clearly illustrate the technical solutions of the embodiments of the present disclosure or the prior art, the figures that are required to describe the embodiments or the prior art will be briefly introduced below. Apparently, the figures that are described below are some embodiments of the present disclosure, and a person skilled in the art may obtain other figures according to these figures without paying creative work.

DETAILED DESCRIPTION

The technical solutions of the embodiments of the present disclosure will be clearly and completely described below with reference to the drawings of the embodiments of the present disclosure. Apparently, the described embodiments are merely certain embodiments of the present disclosure, rather than all of the embodiments. All of the other embodiments that a person skilled in the art obtains on the basis of the embodiments of the present disclosure without paying creative work fall within the protection scope of the present disclosure.

In the embodiments of the present disclosure, words such as "first" and "second" are used to distinguish the same items or similar items with basically the same functions and effects, which are only used to clearly describe the technical solutions of the embodiments of the present disclosure, and are not to be construed as indicating or implying any relative importance or a number of indicated technical features.

In the embodiments of tire present disclosure, "a plurality of groups" means two groups or more than two groups, unless specifically defined otherwise.

Figure 1:
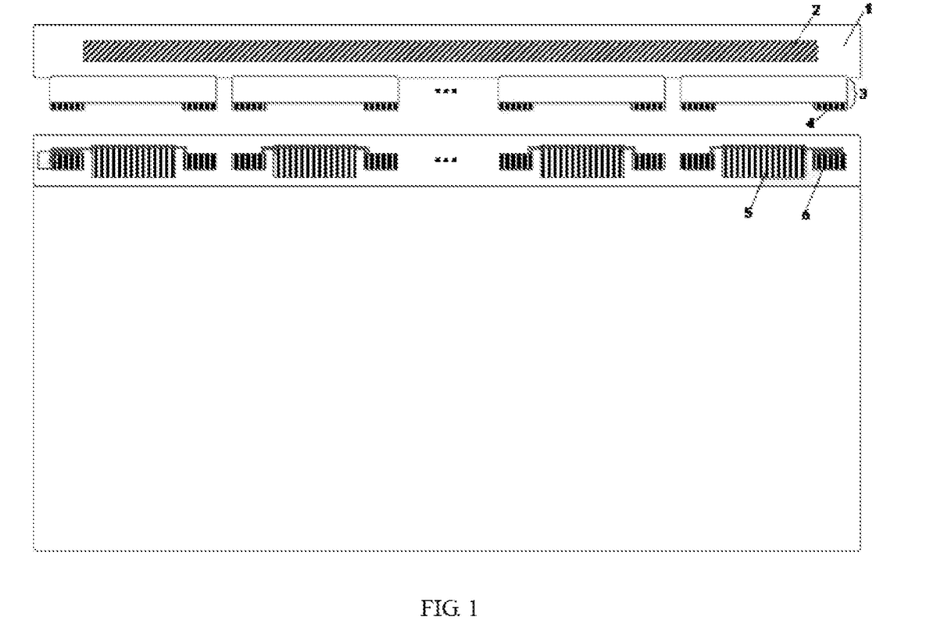
FIG. 1 is a schematic diagram of a display panel and a detection device presided in the related art.

In the related art, as shown in FIG. 1, during a lightening test, positions of a plurality of probe blocks 3 on a base 1 of a probe unit are in one-to-one correspondence with positions of a plurality of COF (Chip On Film) bonding areas 5, and one side of each probe block 3 close to a display panel is respectively provided with two groups of probes 4 which are respectively contacted with lightening test pins 6 on two sides of the corresponding COF bonding area 5. Certainly, the base 1 of the probe unit is further provided with a Printed Circuit Board (PCB) 2. For liquid crystal display products with small size and high resolution, the larger number of the COF bonding areas, but the smaller panel size will inevitably lead to too small spacing between the COF bonding areas. However, if a distance between two groups of lightening test pins between the adjacent COF bonding areas is too small, two adjacent probe blocks corresponding to the two groups of lightening test pins on the probe unit will interfere with each other, which seriously affects signal transmission, so that lightening may not be realized.

Figure 2:
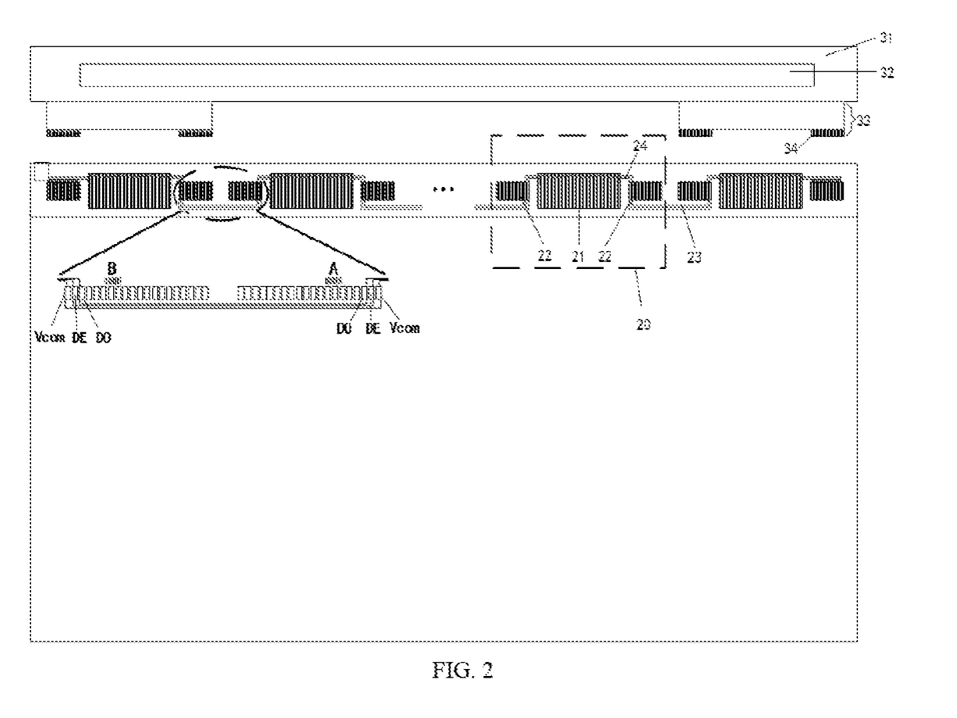
FIG. 2 is a schematic diagram of a display panel and a detection device provided by the embodiments of the present disclosure.

The embodiments of the present disclosure provide a detection structure, which is located in a non-display area of a display panel. As shown in FIG. 2, the detection structure comprises a plurality of test units 20 and a plurality of groups of first connecting lines 23.

Each of the plurality of test units 20 comprises a chip bonding part 21, test pin parts 22 located on two sides of the chip bonding part 21 and a plurality of groups of second connecting lines 24.

In each of the plurality of test units 20, a first end (not marked in the figure) of each group in the plurality of groups of second connecting lines 24 is connected with the test pin parts 22, and a second end (not marked in the figure) of each group in the plurality of groups of second connecting lines 24 is connected with the chip bonding part 21.

In any two adjacent test units in the plurality of test units, two adjacent test pin parts 22 are respectively connected with the first end (not marked in FIG. 2) and the second end (not marked in FIG. 2) of one group in the plurality of groups of first connecting lines 23.

When the detection structure is used in a lightening test, at least two test units arranged at intervals are configured for being electrically connected with a detection device respectively.

According to the related art, the display panel above comprises a display area (Active Area, AA) and a non-display area, wherein the display area refers to an area for realizing display, and the non-display area is generally configured for setting a driving circuit or the like.

The chip bonding part above is configured for subsequently bonding chips. Here, the methods for subsequently bonding the chips are not limited, for example, a Chip On Film (COF) or a Chip On Glass (COG) and other packaging forms. In order to meet the requirement of narrow framing, the COF packaging form may be selected.

It should be noted that the display panel comprises a plurality of subpixels arranged in an array in the display area. In a lightening test, the chip bonding part above is also electrically connected with the plurality of subpixels so as to input a signal to the subpixels according to a signal input from the test pin part, thereby realizing display, and further realizing detection according to a condition of a display frame.

A number of pins comprised in the test pin parts above and types of signals transmitted by each pin are not limited, which are determined according to the specific test requirements. In the lightening test, the test pin part may receive the signal output by the detection device and transmit the signal to the chip bonding part.

When the detection structure is used in a lightening test, the first ends and the second ends of the plurality of groups of second connecting lines are not disconnected, so that the chip bonding parts and the test pin parts in each of the plurality of test units are connected. The first ends and the second ends of the plurality of groups of first connecting lines are not disconnected, so that the plurality of test units are connected in series. However, after the lightening test, the first ends and the second ends of the plurality of groups of second connecting lines are disconnected, so that the chip bonding parts in the plurality of test units are kept independent. In this case, the first ends and the second ends of the plurality of groups of first connecting lines may either be disconnected or kept in an original state, and the latter is generally selected in order to reduce the manufacturing process. Here, the number of each group of the first connecting lines and each group of the second connecting lines is specifically determined according to a number of signals that are transmitted. Here, a material of the first connecting lines and the second connecting line is not limited, and may be, for example, a metal such as copper, silver, or the like. The plurality of first connecting lines connected to the data odd pins and data even pins are disposed at the same layer with a source drain electrode layer, and the plurality of second connecting lines connected to the pad of common pins are disposed at the same layer with a gate. Here, setting positions of the first connecting lines and the second connecting lines are not limited. In view of not increasing space and not affecting the subsequent process, the first connecting lines may be arranged at one side of two adjacent test pin parts close to the display area (i.e., lower sides of the test pin parts shown in FIG. 2), and the second connecting lines may be arranged at one sides of the two test pin parts far away from the display area (i.e., upper sides of the test pin parts shown in FIG. 2).

In the above lightening test, the description that the at least two test units arranged at intervals are configured for being electrically connected with the detection device respectively refers to that: in the lightening test, only two test units arranged at intervals are configured for being electrically connected with the detection device respectively; or, three or more than three test units arranged at intervals are configured for being electrically connected with the detection device respectively. Here, a number of the spaced test units is not required, which may be that one test unit is spaced, or two or more than two test cells are spaced. The larger the number of the spaced test units is, the larger the spacing between the test units electrically connected with the detection device is, and the larger the spacing between the test pin parts of the adjacent test units electrically connected with the detection device is, which is more beneficial for avoiding the problem that the lightening may not be realized due to interference of the probe blocks caused by too small spacing between the test pin parts.

It should be noted that the problem that the lightening may not be realized due to the interference of the probe blocks caused by too small spacing between the test pin parts is particularly prominent in the display panels with small size and high resolution. Therefore, the above detection structure is mostly applied to the display panels with small size and high resolution. However, the embodiments of the present disclosure are not limited thereto, and a display panel with big size and high resolution may also comprise the detection structure mentioned above.

The embodiments of the present disclosure provide a detection structure, which may be located in a non-display area of a display panel. The detection structure comprises a plurality of test units and a plurality of groups of first connecting lines; each of the plurality of test units comprises a chip bonding part, test pin parts located at two sides of the chip bonding part, and a plurality of groups of second connecting lines; in each of the plurality of test units, a first end of each group of second connecting lines in the plurality of groups of second connecting lines is connected with the test pin parts, and a second end of each group of second connecting lines in the plurality of groups of second connecting lines is connected with the chip bonding part; in any two adjacent test units in the plurality of test units, two adjacent test pin parts are respectively connected with the first end and the second end of one group in the plurality of groups of first connecting lines; and when the detection structure is used in a lightening test, at least two test units arranged at intervals are configured for being electrically connected with a detection device respectively. The number of the test units may increase when the load becomes larger, and the quantity of the test units is not limited here.

Thus, in the lightening test, it is only required at least two test units arranged at intervals are electrically connected with the detection device respectively, which avoids that all the test units are electrically connected with the detection device, so that the spacing between the test units electrically connected with the detection device may be increased, and the spacing between the test pin parts of the adjacent test units electrically connected with the detection device may be increased. In this way, when the lightening test is performed on the display panel having the detection structure above, the problem that the lightening may not be realized due to the interference of the probe blocks caused by too small spacing between the test pin parts may be avoided.

The following describes signal transmission situations of the test pin parts in a 2D lightening test and a 3D lightening test respectively.

For the first case, since a lot of data signal line terminals are provided in the display panel, in order to save the cost in the product mass production, a 2D lightening solution is mainly adopted at present. In the 2D lightening test, odd-numbered and even-numbered data signal terminals are connected together by short-circuit lines respectively, so that a power-up test of all the signal lines may be completed by inputting signals to only two data lines.

In this case, optionally, referring to an enlarged view of a circled part in FIG. 2, each test pin part comprises at least a data odd pin (DO pin), a data even pin (DE pin), and a common signal line pin (Vcom pin). In FIG. 2, in order to clearly illustrate a structure of the test pin part, two test pin parts defined by the circle are enlarged and drawn, and the enlarged view is arranged below the detection structure.

Each group of the plurality of groups of first connecting lines composes three first connecting lines, and the three first connecting lines are respectively and correspondingly connected with the data odd pins, the data even pins and the common signal line pins of two adjacent test pin parts.

The data odd pins, the data even pins and the common signal line pins above are respectively configured for transmitting a data odd (Data Odd, DO) signal, a data even (Data Even, DE) signal and a common signal line (Vcom) signal. If the detection structure is applied to a liquid crystal display panel, the common signal line signal is a signal for driving a common electrode. If the detection structure is applied to other types of display panels, the common signal line signal may be correspondingly adjusted to a similar driving signal.

By applying different signals to the data odd pins, the data even pins and the common signal line pins, the subpixels in odd columns may display the same gray scale, and the subpixels in even columns may display the same gray scale, thereby completing the 2D lightening test.

Certainly, the test pin parts mentioned above may also comprise other pins for transmitting other signals, and only the contents related to the invention point are described here, and detailed description of other pins is omitted here.

For the second case, in order to improve an accuracy of the test, a 3D lightening solution may also be employed. In this solution, data signal terminals with the subpixels of the same color are connected together. Generally, the display panel comprises a red subpixel, a green subpixel and a blue subpixel. Therefore, the power-up test of all the signal lines may be completed only by inputting signals to three data lines.

In this case, optionally, each of the test pin parts comprises at least a first subpixel data line pin, a second subpixel data line pin, a third subpixel data line pin and a common signal line pin. The first subpixel data line pin may be a red subpixel data line pin, the second subpixel data line pin may be a green subpixel data line pin and the third subpixel data line pin may be a blue subpixel data line pin. The colors of subpixel data line pin may be various colors, and the colors of subpixel data line pins are not limited in detailed description.

Each group of the plurality of groups of first connecting lines comprises four first connecting lines, and the four first connecting lines are respectively and correspondingly connected with the red subpixel data line pins, the green subpixel data line pins, the blue subpixel data line pins and the common signal line pins of two adjacent test pin parts.

The red subpixel data line pins, the green subpixel data line pins, the blue subpixel data line pins and the common signal line pins above are respectively configured for transmitting a red subpixel data line signal, a green subpixel data line signal, a blue subpixel data line signal and a common signal line signal. If the detection structure is applied to a liquid crystal display panel, the common signal line signal is a signal for driving a common electrode. If the detection structure is applied to other types of display panels, the common signal line signal may be correspondingly adjusted to a similar driving signal.

By applying different signals to the reel subpixel data line pins, the green subpixel data line pins, the blue subpixel data line pins and the common signal line pins, all the red subpixels may display the same gray scale, all the green subpixels may display the same gray scale, and all the blue subpixels may display the same gray scale, thereby completing the 3D lightening test.

For the third case, in order to improve an accuracy of the test, a 4D lightening solution may also be employed. In tins solution, data signal terminals with the subpixels of the same color are connected together, generally, in a 4D lightening test. Certainly, the test pin parts mentioned above may also comprise other pins for transmitting signals, like the products made of pixel design of RGBW and RGBY. The RGBW technology adds W white subpixels to the original three primary colors of RGB, so a first subpixel data line pin, a second subpixel data line pin, a third subpixel data line pin and a fourth subpixel data line pin may be a red subpixel data line pins, a green subpixel data line pin, a blue subpixel data line pin, a white subpixel data line pin and a common signal line pins which are respectively configured for transmitting a red subpixel data line signal, a green subpixel data line signal, a blue subpixel data line signal, a white subpixel data line signal and a common signal line signal, all the red subpixels may display the same gray scale, all the green subpixels may display the same gray scale, all the blue subpixels may display the same gray scale, and all the white subpixels may display the same gray scale to become a four-color pixel design. The RGBY technology adds Y yellow subpixels to the original three primary colors of RGB, so a first subpixel data line pin, a second subpixel data line pin, a third subpixel data line pin and a fourth subpixel data line pin may be a red subpixel data line pin, a green subpixel data line pin, a blue subpixel data line pin, a yellow subpixels data line pins and a common signal line pins which are respectively configured for transmitting a red subpixel data line signal, a green subpixel data line signal, a blue subpixel data line signal, a yellow subpixel data line signal and a common signal line signal, all the red subpixels may display the same gray scale, all the green subpixels may display the same gray scale, and all the blue subpixels may display the same gray scale, and all the yellow subpixels may display the same gray scale to become a four-color pixel design, thereby completing the 4D lightening test.

Certainly, other test pins may also transmit data odd signals, data even signals and common signals, like 1D lightening, although the load is large, it may still transmit data odd signals, data even signals and common signals, and only the contents related to the invention point are described here, the detailed description of other pins is omitted here.

Optionally, when the detection structure is used in a lightening test, two test units arranged at intervals are electrically connected with the detection device respectively, and the two test units arranged at intervals are located at two ends of the detection structure respectively (i.e., leftmost and rightmost ends of the detection structure in FIG. 2).

For convenience of description, the test unit located at the leftmost end in FIG. 2 is simply referred to as the test unit L, and the test unit located at the rightmost end is simply referred to as the test unit R.

If the 2D lightening solution is adopted, the test unit L and the test unit R are electrically connected with the detection device respectively, and the test pin parts at two sides of the test unit L and the test unit R may at least respectively acquire the data odd (Data Odd, DO) signals, the data even (Data Even, DE) signals and the common signal line (Vcom) signals.

If the detection structure above is applied to a Gate Driver on Array (GOA) display panel, the test pin part on the left side of the test unit L and the test pin part on the right side of the test unit R may further comprise a gate signal pin part for acquiring a GOA driving control signal. The GOA driving control signal may control a GOA driving circuit to output a gate signal.

When the detection structure is used in a lightening test, only two test units are electrically connected with the detection device respectively, so that a number of probe blocks in the detection device is reduced to the greatest extent. Meanwhile, the two test units electrically connected with the detection device are respectively located at two ends of the detection structure, so that the spacing between the two test units is increased to the greatest extent, and the problem that the lightening may not be realized due to interference of the probe blocks caused by too small spacing between the test pin parts may be completely avoided.

The embodiments of the present disclosure also provide a display panel, comprising the detection structure mentioned above and a plurality of subpixels located in a display area and arranged in an array, wherein the plurality of groups of second connecting lines in the detection structure are disconnected. In this case, the plurality of groups of first connecting lines may be disconnected or kept in an original state, and the latter is generally selected in order to reduce the manufacturing process.

Figure 3A:
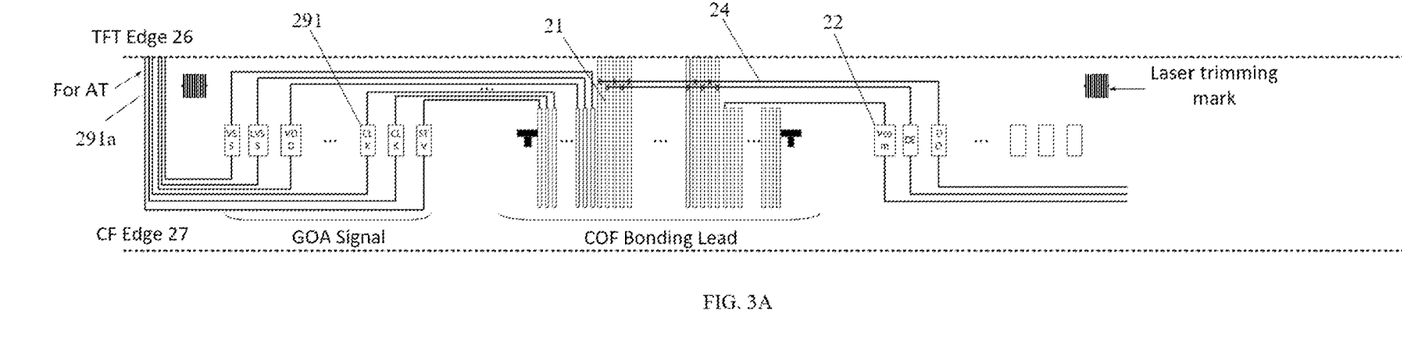
FIG. 3A to FIG. 3D are schematic diagrams of the display panel provided by the embodiments of the present disclosure.

FIG. 3A to FIG. 3D are schematic diagrams of the display panel provided by the embodiments of the present disclosure. FIG. 3A to FIG. 3D are partially enlarged diagrams of FIG. 2. As shown in FIG. 3A, the embodiment of the present disclosure provides a display panel, the display panel comprises the chip bonding part 21, the plurality of test pin parts 22, the plurality of first connecting lines 23 and second connecting lines 24 as shown in FIG. 2. There are also a Thin Film Transistor (TFT) edge 26, a Compact Flash (CF) edge 27, a GOA signal pad 291 and GOA signal lines 291a shown in FIG. 3A.

As illustrated above, there are a plurality of test units 20 disposed in a line, and at least two test units 20 arranged at intervals are electrically connected with the detection device respectively. FIG. 3A shows the test unit 20 disposed in the front of the line. In the implementation of FIG. 3A, there are GOA signal pads 291 signally connected to the chip bonding part 21 (which takes COF bonding leads herein as an example). Further, there are GOA signal lines 291a connected to the GOA signal pads 291 to perform the array test before CT test.

There is no CF glass substrate covered between the TFT edge 26 and the CF edge 27.

Figure 3B:
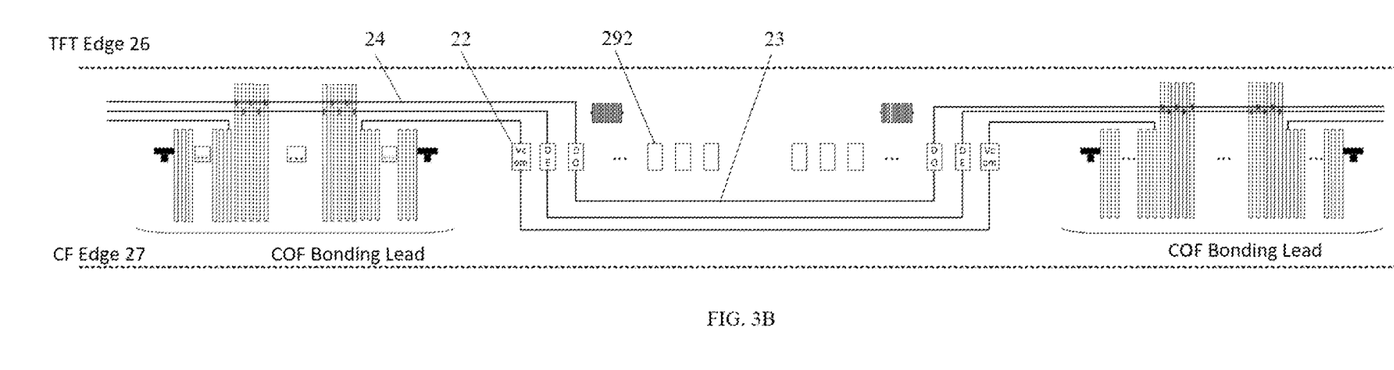

FIG. 3B is another implementation of the embodiment in FIG 3A. FIG. 3B shows two adjacent test units 20. In FIG. 3B, there may be dummy pads 292 provided between the test pin part 22 of one test unit 20 and the test pin part 22 of another test unit 20. However, although dummy pads 292 are provided, the dummy lines may not be provided in the implementation of FIG. 3B.

Figure 3C:
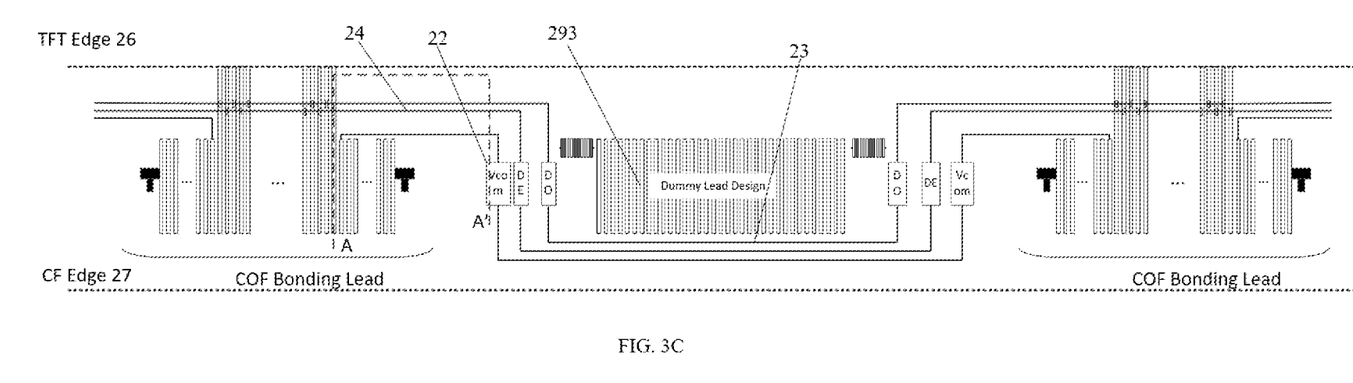

FIG. 3C is still another implementation of the embodiment in FIG. 3A. FIG. 3C shows two adjacent test units 20. In FIG. 3C, there may be dummy lines 293 provided between the test pin part 22 of one test unit 20 and the test pin part 22 of another test unit 20. Dummy pads 292 may be provided or not be provided.

Figure 3D:
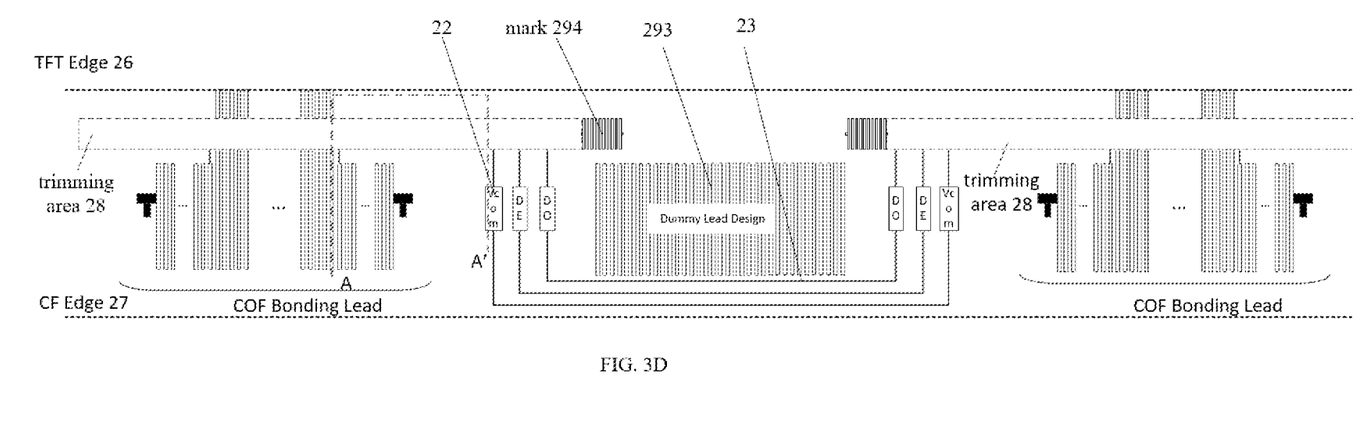

FIG. 3D shows the test units 20 after trimming. As shown in FIG. 3D, there are two trimming areas 28. After trimming, the second connecting lines 24 are ablated by laser. The test pin parts 22 may have small protrusions leaved after trimming. The pins of the chip bonding part 21 and five pads of the test pin parts 22 may have some track at the position adjacent to the trimming area 28.

The trimming area 28 may be formed according to a trimming mark 294. As shown in FIG. 3D, the start position of the trimming area 28 is the trimming mark 294, that is the trimming process starts from the trimming mark 294. The width of the trimming area 28 along the extension direction of the pins of the test pin parts 22 may be around 200 um, and correspondingly, the width of the trimming mark 294 may be set around 200 um. The trimming mark may be a plurality of metal lines arranged side by side with one another.

Figure 4:
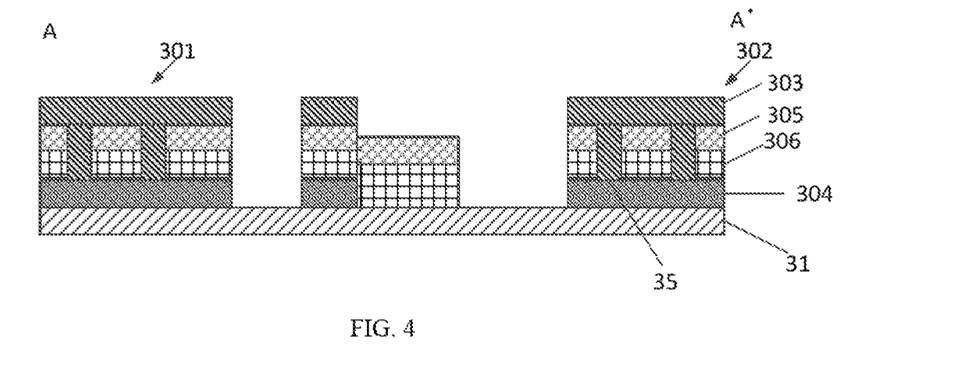
FIG. 4 is a cross-sectional view of the A-A' section in FIG. 3A to FIG. 3D.

FIG. 4 illustrates a cross-sectional view of the A-A' section in FIG. 3A to FIG. 3D, the reverse-U shaped A-A' section represents the cutting line that passes through a chip bonding part 21, a trimming area 28 and a test pin parts 22 in FIG. 3A to FIG. 3D, each pin of the chip bonding part 21 is disconnected from each other after ablation by the laser in order to avoid short circuit, and it may keep supplying display signals, during the ablation by the laser, the plurality of second connecting line 24 is burned out to form the trimming area, and the trimming area is a groove in FIG. 4, and a glass substrate of the display panel may be seen through the groove.

As shown FIG. 4, the pin 301 of the test pin part 22 and the pad 302 of the chip bonding part 21 are multi-layer structures. The pin 301 and the pad 302 are disposed on the base 31, via holes 35 are provided to connect an ITO layer 503 and a metal layer 304. An insulating layer 305 which may be made of PVX and a gride electrode insulating layer 306 are disposed between the ITO layer 303 and the metal layer 304. The metal layer 304 in FIG. 4 may be gate metal layer or source drain metal layer. If it is gate metal layer, the layer structure of the whole pin 301 and pad 302 may be Gate-GI-PVX-ITO as in FIG. 4, and if it is source drain metal layer, the layer structure may be GI-SD-PVX-ITO. In FIG. 4, the layers with the same filled pattern may use the same material and they may be formed with one layout process.

The display panel may be a Twisted Nematic (TN) type, Vertical Alignment (VA) type, In-Plane Switching (IPS) type or Advanced Super Dimension Switch (ADS) type liquid crystal display panel, and may also be an Organic Light-Emitting Diode (OLED) display panel and any product or component having a display function such as a television, a digital camera, a mobile phone, a tablet computer, and the like comprising these display panels. The display panel has the characteristics of high yield and good product quality.

It should be noted that the display panel above may be manufactured by the following method:

S01. The display panel is detected, wherein the display panel comprises the detection structure mentioned above, and neither the plurality of groups of second connecting lines nor the plurality of groups of first connecting lines in the detection structure are disconnected.

S02. After it is detected that the display panel is normal, the plurality of groups of second connecting lines are cut off to obtain the display panel according to the embodiments of the present disclosure.

Here, the specific cutting method is not limited. With reference to the enlarged view shown in FIG. 2, a mark A is arranged on an upper side of the test pin part on a left side of each of the plurality of test units, and a mark B is arranged on an upper side of the test pin part on a right side, and laser may be employed to cut at the mark A and the mark B. A cutting width is greater than or equal to a width of one group of second connecting lines.

The embodiments of the present disclosure also provide a detection device for detecting a display panel, wherein the display panel comprises the detection structure mentioned above, and neither the plurality of groups of second connecting lines nor the plurality of groups of first connecting lines in the detection structure are disconnected. The detection device comprises at least two probe blocks arranged at intervals. The probe blocks are contacted with the plurality of test units in the detection structure of the display panel in a lightening test, wherein the probe blocks are in one-to-one correspondence to the plurality of test units.

The above detection device uses the probe block to output a signal and thus is also referred to as a Probe Unit (PU). Referring to FIG. 2, in addition to a probe block 33, the detection device further comprises a base 31, a circuit board 32, and the like. One side of the probe block 33 close to the display panel has two groups of probes (Blades) 34. The probe block is in one-to-one correspondence with the test unit, and then the two groups of probes on the probe block are respectively in one-to-one correspondence with the test pin parts at two sides of the test unit.

The description that the detection device above comprises at least two probe blocks arranged at intervals means that: the detection device only comprises two probe blocks arranged at intervals; or, the detection device comprises three or more than three probe blocks arranged at intervals.

Here, a number of the spaced probe blocks is not required, which may be that one probe block is spaced, or two or more than two probe blocks are spaced. The larger the number of the spaced probe blocks is, the larger the spacing between the adjacent probe blocks is, which is more beneficial for avoiding the problem that the lightening may not be realized due to interference between the adjacent probe blocks. The number and the spacing distance of the probe blocks are the same as the setting of the test units for being electrically connected with the detection device in the detection structure of the display panel.

The embodiments of the present disclosure also provide a detection device for detecting a display panel, wherein the display panel comprises the detection structure mentioned above, and neither the plurality of groups of second connecting lines nor the plurality of groups of first connecting lines in the detection structure are disconnected. The detection device comprises at least two probe blocks arranged at intervals. The probe blocks are contacted with the plurality of test units in the detection structure of the display panel in a lightening test, wherein the probe blocks are in one-to-one correspondence to the plurality of test units. Due to that spacing arrangement of the probe blocks, the spacing between adjacent probe blocks becomes large, thus avoiding interference. In this way, when the detection device is employed to test the display panel above, the problem that the lightening may not be realized due to the interference of the probe blocks caused by too small spacing between the test pin parts may be avoided. Meanwhile, the problem of interference between the probe blocks and device components (for example, the circuit board) may be avoided.

Moreover, compared with the related art, in a lightening test, because the test units electrically connected with the detection device are greatly reduced, the number of the probe blocks in the detection device is also reduced greatly. On one hand, the production test cost is reduced. On the other hand, a risk of Block Miss between the probe blocks and the test pin parts and a risk of scratching a display Panel ID by the probe of the probe block are greatly reduced.

Optionally, as shown in FIG. 2, the detection device 30 comprises two probe blocks 33 arranged at intervals, and the two probe blocks 33 arranged at intervals are respectively located at two ends of the detection device 30.

For convenience of description, the probe block located at the leftmost end in FIG. 2 is simply referred to as the probe block L, and the probe block located at the rightmost end is simply referred to as the probe block R.

In a lightening test, two groups of probes of the probe block L are respectively connected with the test pin parts at two sides of the test unit 1 described above, and two groups of probes of the probe block R are respectively connected with the test pin parts at two sides of the test unit R described above, thus realizing signal transmission. If the 2D lightening solution is adopted, the probe block L and the probe block R respectively input Data Odd (DO) signals. Data Even (DE) signals and common signal line (Vcom) signals to the test pin parts of the test unit L and the test pin parts of the test unit R.

If the detection device above is configured for detecting a GOA display panel, in the 2D lightening solution, the probe block L and the probe block R also input a GOA control signal to the test pin parts on the left side of the test unit L and the test pin parts on the right side of the test unit R respectively.

The detection device greatly reduces the number of the probe blocks and further reduces the cost. Meanwhile, the spacing between two probe blocks is increased to the maximum extent, which may completely avoid the problem that the lightening may not be realized due to the interference of the probe blocks cause by too small spacing between the test pin parts.

Optionally, the detection device further comprises a plurality of probe block clamping slots arranged at intervals. The probe block clamping slots may be configured for fixing the probe blocks. On one hand, the detection device may adapt to display panels with different settings, thereby expanding an application range of the detection device. On the other hand, in case of insufficient data signal driving, the probe blocks may be added as appropriate to enhance a data signal driving capability.

The embodiments of the present disclosure also provide a detection system, comprising a controller, a display panel and the detection device above.

The display panel comprises the detection structure mentioned above, and neither the plurality of groups of second connecting lines nor the plurality of groups of first connecting lines in the detection structure are disconnected.

The detection device is configured for detecting five display panel mentioned above.

The controller is configured for inputting a data signal to the probe block of the detection device; detecting whether a display frame of the display panel is good; if yes, determining that the display panel is normal; and if not, determining that the display panel is abnormal.

The controller above may be integrated on the detection device or may be provided separately, which will not be limited here.

The detection system may avoid the problem that the lightening may not be realized due to the interference of the probe blocks caused by too small spacing between the test pin parts. Meanwhile, the problem of interference between the probe blocks and device components (for example, the circuit board) may be avoided. Moreover, compared with the related art, in a lightening test, because the test units electrically connected with the detection device are greatly reduced, the number of the probe blocks in the detection device is also reduced greatly. On one hand, the production test cost is reduced. On the other hand, a risk of Block Miss between the probe blocks and the test pin parts and a risk of scratching a display Panel ID by the probe of the probe block are greatly reduced.

The foregoing descriptions are merely detailed embodiments of the present disclosure, but the protection scope of the present disclosure is not limited thereto. Any person skilled in the art may easily think of changes or substitutions within the technical scope of the present disclosure, and all the changes or substitutions shall be covered by the protection scope of the present disclosure. Therefore, the protection scope of the present disclosure should be subjected to the protection scope of the claims.

The above-described device embodiments are merely illustrative, wherein the units that are described as separate components may or may not be physically separate, and the components that are displayed as units may or may not be physical units; in other words, they may be located at the same one location, and may also be distributed to a plurality of network units. Part or all of the modules may be selected according to the actual demands to realize the purposes of the solutions of the embodiments. Those of ordinary skills in the art may understand and implement the technical solutions without paying creative work.

The "one embodiment", "an embodiment" or "one or more embodiments" as used herein means that particular features, structures or characteristics described with reference to an embodiment are included in at least one embodiment of the present disclosure. Moreover, it should be noted that here an example using the wording "in an embodiment" does not necessarily refer to the same one embodiment.

The description provided herein describes many concrete details. However, it may be understood that the embodiments of the present disclosure may be implemented without those concrete details. In some of the embodiments, well-known processes, structures and techniques are not described in detail, so as not to affect the understanding of the description.

In the claims, any reference signs between parentheses should not be construed as limiting the claims. The word "comprise" does not exclude elements or steps that are not listed in the claims. The word "a" or "an" preceding an element does not exclude the existing of a plurality of such elements. The present disclosure may be implemented by means of hardware comprising several different elements and by means of a properly programmed computer. In unit claims that list several devices, some of those devices may be embodied by the same item of hardware. The words first, second, third and so on do not denote any order. Those words may be interpreted as names.

Finally, it should be noted that the above embodiments are merely intended to explain the technical solutions of the present disclosure, and not to limit them. Although the present disclosure is explained in detail by referring to the above embodiments, a person skilled in the art should understand that he may still modify the technical solutions set forth by the above embodiments, or make equivalent substitutions to part of the technical features of them. However, those modifications or substitutions do not make the essence of the corresponding technical solutions depart from the spirit and scope of the technical solutions of the embodiments of the present disclosure.

The invention claimed is:

1. A detection structure located in a non-display area of a display panel, the detection structure comprising: a plurality of test units and a plurality of groups of first connecting lines, wherein:
   each of the plurality of test units comprises a chip bonding part, test pin parts located at two sides of the chip bonding part, and a plurality of groups of second connecting lines;
   in each of the plurality of test units, a first end of each group of second connecting lines in the plurality of groups of second connecting lines is connected with the test pin parts, and a second end of each group of second connecting lines in the plurality of groups of second connecting lines is connected with the chip bonding part;
   in any two adjacent test units in the plurality of test units, two adjacent test pin parts are respectively connected with a first end and a second end of one group in the plurality of groups of first connecting lines; and
   the plurality of groups of first connecting lines connected to the data pad odd pins and data even pins are disposed at the same layer with a source drain electrode layer, and the plurality of groups of second connecting lines connected to the pad of common pins are disposed at the same layer with a gate.

2. The detection structure according to claim 1, wherein:
   each of the test pin parts comprises at least a data odd pin, a data even pin, and a common signal line pin; and
   each group of the plurality of groups of first connecting lines comprises three first connecting lines, and the three first connecting lines are respectively and correspondingly connected with the data odd pins, the data even pins and the common signal line pins of two adjacent test pin parts.

3. The detection structure according to claim 1, wherein:
each of the test pin parts comprises at least a first color subpixel data line pin, a second color subpixel data line pin, a third color subpixel data line pin and a common signal line pin; and
each group of the plurality of groups of first connecting lines comprises four first connecting lines, and the four first connecting lines are respectively and correspondingly connected with the first color subpixel data line pins, the second color subpixel data line pins, the third color subpixel data line pins and the common signal line pins of two adjacent test pin parts.

4. The detection structure according to claim 3, wherein: the first color subpixel data line pin is a red subpixel data line pin, the second color subpixel data line pin is a green subpixel data line pin and the third subpixel data line pin is a blue subpixel data line pin; and the red subpixel data line pin, the green subpixel data line pin, the blue subpixel data line pin and the common signal line pin are respectively configured for transmitting a red subpixel data line signal, a green subpixel data line signal, a blue subpixel data line signal and a common signal line signal.

5. The detection structure according to claim 1, wherein each of the test pin parts comprises:
a first color subpixel data line pin, a second color subpixel data line pin, a third color subpixel data line pin, a fourth color subpixel data line pin and a common signal line pin.

6. The detection structure according to claim 5, wherein: the first color subpixel data line pin is a red subpixel data line pin, the second color subpixel data line pin is a green subpixel data line pin, the third subpixel data line pin is a blue subpixel data line pin and the fourth subpixel data line pin is a white subpixel data line pin; and
the red subpixel data line pin, the green subpixel data line pin, the blue subpixel data line pin, the white subpixel data line and the common signal line pin are respectively configured for transmitting a red subpixel data line signal, a green subpixel data line signal, a blue subpixel data line signal, a white subpixel data line signal and a common signal line signal.

7. The detection structure according to claim 5, wherein: the first color subpixel data line pin is a red subpixel data line pin, the second color subpixel data line pin is a green subpixel data line pin, the third subpixel data line pin is a blue subpixel data line pin and the fourth subpixel data line pin is a yellow subpixel data line pin; and
the red subpixel data line pin, the green subpixel data line pin, the blue subpixel data line pin, the yellow subpixel data line pin and the common signal line pin are respectively configured for transmitting a red subpixel data line signal, a green subpixel data line signal, a blue subpixel data line signal, a yellow subpixel data line signal and a common signal line signal.

8. The detection structure according to claim 1, wherein when the detection structure is used in a lightening test, two test units arranged at intervals are electrically connected with the detection device respectively; and the two test units arranged at intervals are located at two ends of the detection structure respectively.

9. A display panel, comprising: the detection structure according to claim 1; and a plurality of subpixels located in a display area and arranged in an array.

10. The display panel according to claim 9, wherein the plurality of groups of second connecting lines are arranged at one side of two adjacent test pin parts far away from the display area.

11. A detection device for detecting a display panel, wherein: the display panel comprises the detection structure according to claim 1, and neither the plurality of groups of second connecting lines nor the plurality of groups of first connecting lines in the detection structure are disconnected; and
the detection device comprises at least two probe blocks arranged at intervals, and the probe blocks are contacted with the plurality of test units in the detection structure of the display panel in a lightening test, wherein the probe blocks are in one-to-one correspondence to the plurality of test units.

12. The detection device according to claim 11, wherein the detection device comprises the two probe blocks arranged at intervals, and the two probe blocks arranged at intervals are respectively located at two ends of the detection device.

13. The detection device according to claim 12, wherein the detection device further comprises a plurality of probe block clamping slots arranged at intervals.

14. A detection system, comprising: a controller; a display panel; and the detection device according to claim 11, wherein:
the display panel comprises the detection structure and neither the plurality of groups of second connecting lines nor the plurality of groups of first connecting lines in the detection structure are disconnected;
the detection device is configured for detecting the display panel; and
the controller is configured for inputting a data signal to the probe block of the detection device; detecting whether a display frame of the display panel is good; if yes, determining that the display panel is normal; and if not, determining that the display panel is abnormal.

15. A display panel, comprising: a plurality of test units; a plurality of groups of first connecting lines, and a plurality of subpixels located in a display area and arranged in an array, wherein:
each of the plurality of test units comprises a chip bonding part and test pin parts located at two sides of the chip bonding part;
in any two adjacent test units in the plurality of test units, two adjacent test pin parts are respectively connected with a first end and a second end of one group in the plurality of groups of first connecting lines; and
the display panel further comprises a trimming mark and a trimming area, and the trimming area extends from the trimming mark and passes through the chip bonding part.

16. The display panel according to claim 15, wherein: the chip bonding part is configured for bonding a chip; and the chip bonding part is electrically connected with the plurality of subpixels in a lightening test so as to input a signal to the subpixels according to a signal input from the test pin part.

17. The display panel according to claim 15, wherein the plurality of groups of first connecting lines are arranged at one side of two adjacent test pin parts close to the display area.

18. The panel according to claim 15, wherein the trimming area is a groove exposing a substrate of the display panel, and the trimming area is located at one side of two adjacent test pin parts far away from the display area.

* * * * *